April 26, 1966     A. A. SCARDONI     3,247,985
DUMP TRUCK BODIES
Filed July 9, 1964     2 Sheets-Sheet 1
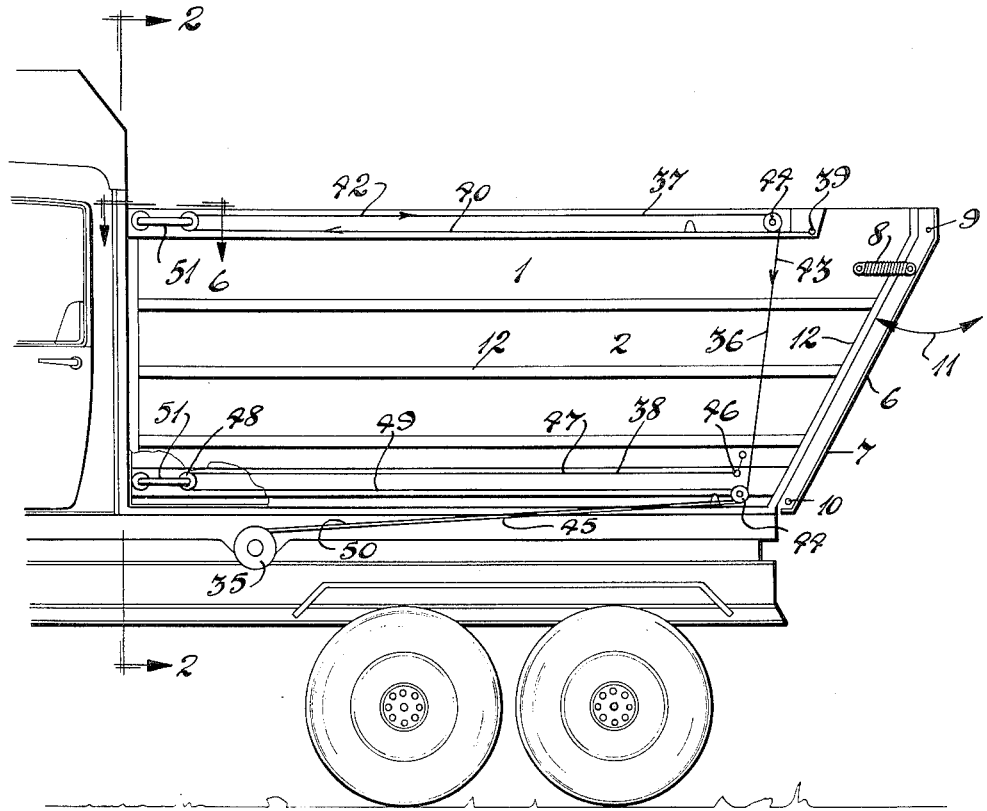
Fig. 1
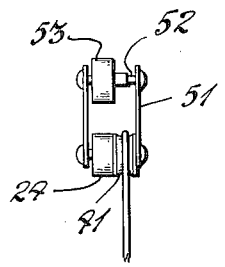
Fig. 6
INVENTOR.
Angelo A. Scardoni
BY
Atty

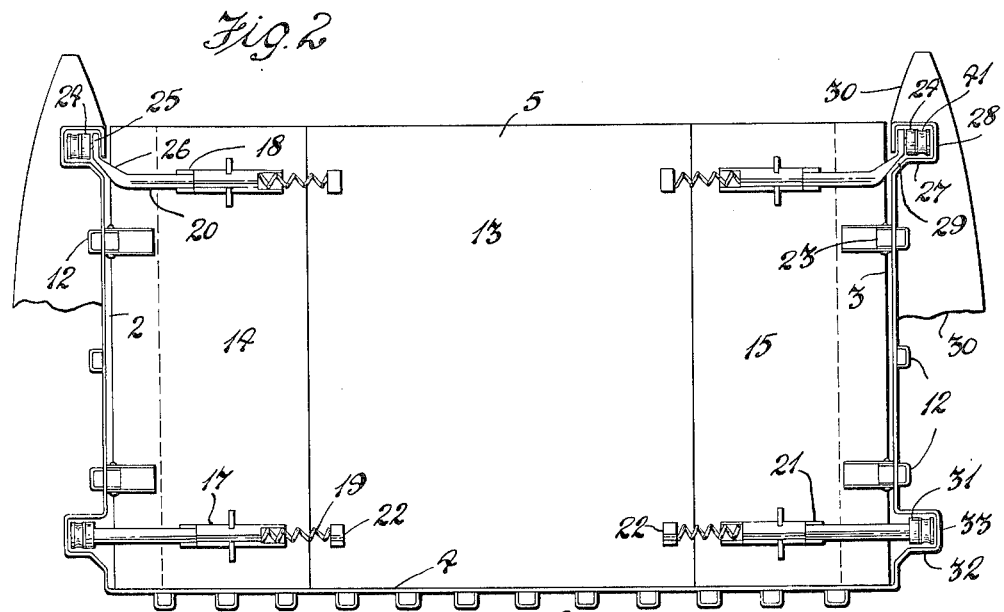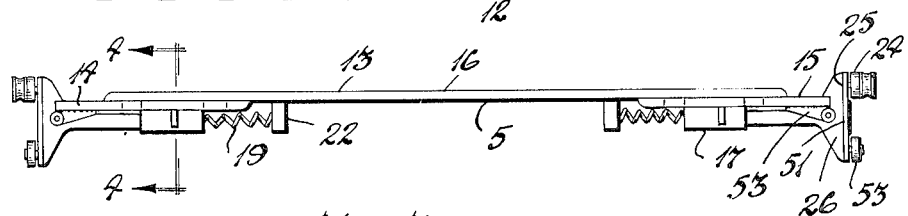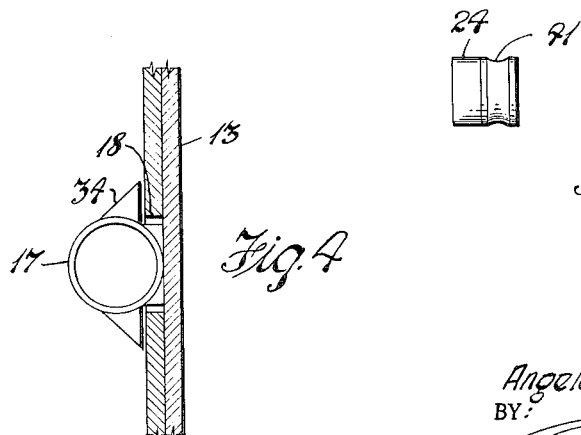

United States Patent Office 3,247,985
Patented Apr. 26, 1966

3,247,985
DUMP TRUCK BODIES
Angelo A. Scardoni, 718 Palmerston Ave.,
Toronto, Ontario, Canada
Filed July 9, 1964, Ser. No. 381,376
3 Claims. (Cl. 214—82)

This invention relates to improvements in dump truck bodies, an object being to provide means whereby the contents of a dump truck body may be emptied quickly, and without the slow, mechanically expensive necessity for tilting the body, a further object is to effect the rapid emptying of a dump truck body in places where there is low head room which renders the upturning of the body impracticable or impossible.

A further object of the present invention is to provide means for emptying a dump truck body in the aforesaid advantageous manner regardless of deformities in the steel side walls, to which deformities the side walls of dump truck bodies are particularly liable due to the hard useage to which they are exposed when crane buckets, and excavator shovels deposit their loads into such bodies, and occasionally hit the side walls.

More particularly the present invention discloses the employment of a front pusher or ramming wall movable between stationary side walls, in its (vertical) plane, such front wall being formed of a plurality of panels, the outer ones of which are spring-biassed so as to move inwardly or outwardly in the plane of the wall as the same travels between the front and rear ends of the body and encounters deformities in the side walls.

A further object of the present invention is to provide arrangements of the character herewithin described which are conspicuously simple; hence inexpensive to manufacture and install; which require a minimum of servicing, and which can be serviced with a minimum of skilled help and/or expensive tools.

With the foregoing objects in view, and such others as may become apparent as this specification proceeds, the present invention consists in the following arrangement and construction of parts all as hereinafter more particularly described, reference being had to the accompanying figures in which:

FIGURE 1 is a predominately (but partly fragmented) side elevation of a dump truck body embodying the present invention.

FIGURE 2 is a section on the line 2—2 of FIGURE 1.

FIGURE 3 is a plan view of the front wall of the present invention.

FIGURE 4 is an enlarged view substantially on the line 4—4 of FIGURE 3.

FIGURE 5 is a detail illustrating one of the combined rollers and pulleys forming part of the present invention.

FIGURE 6 is a plan of the roller and pulley linkage detail as viewed on the line 6—6 of FIGURE 1.

In the drawings, like characters of reference designate similar parts in the several figures.

Essentially the present invention comprises, in a dump truck body, and in combination, a front wall, a movable tail-gate, and means for moving the front wall forwardly and rearwardly between a pair of rigid side walls in its own plane, so as to push or ram the load contained between the three walls and tail-gate from off the rear end of the said body during the rearward movement of the front wall. The front wall consists of at least two, and preferably three, sectional panels in overlapping relationship, and spring means co-acting between the panels normally to bias them apart or outwardly so that the outer side edges of the front wall are contiguous to the side walls of the body. In virtue of such arrangement, the panels move in their plane under the influence of said spring means upon encountering deformities in the side walls.

More particularly the present invention comprises the foregoing combination wherein the front wall is formed of three sectional panels, a centre panel, and two side panels of which the central panel is immovable in the direction of its plane, the side panels overlapping the centre panel to move for the purpose specified under the influence of spring means secured upon the anterior surfaces of the panels.

Proceeding therefore now to describe the present invention in detail, the aforesaid dump truck body is collectively designated 1, the sidewalls 2 and 3, the floor 4, the front wall 5, and the tail-gate 6. The dump truck body as such is also characterized by the novel provision of a rear end generally designated 7 which is inclined forwardly and downwardly. In virtue of such configuration, it will be apparent from the accompanying FIGURE 6 that the tail-gate 6 is biassed by means of the springs 8 toward a closed position (illustrated) in the plane of said rear end. The tail-gate is journalled at 9 between side walls 2 and 3 in the vicinity of the upper rear corners of the side walls. Hence it will be apparent that the tail-gate swings substantially about a horizontal axis co-incident with its upper edge. Suitable latch means are provided at the swinging lower edge 10 whereby, when front wall 5 has travelled to the forward end of the body 1, the tail-gate will be secured against yielding counter clockwise (see double-headed arrow 11). Such latching means are however within the skill of the art and accordingly further description of any particular latching means is deemed unnecessary.

The present invention also contemplates the heating of the side walls 2 and 3 and floor 4 by a system of externally positioned, interconnecting conduits 12.

Front wall 5 according to a preferred exemplification of the inventive concept residing in this feature, and as illustrated in the accompanying drawings, comprises the central panel 13, and pair of side sectional panels 14 and 15. The side panels overlap the anterior surface 16 of centre panel 13 and project beyond it. Welded where indicated against the anterior surface 16 are horizontally disposed and tubular housings 17. These project through the rectangular slots 18 formed in the side panels 14 and 15. Such slots are longer than the housings 17 to permit movement of the side panels in their plane.

Cylindrical coil springs 19 extend into the housings 17 and abut at the outer ends thereof against the upper or lower shafts or thrust-rods 20 and 21. The inner ends of the springs bear against abutments or projecting caps 22 also welded on central panel 13. In order that the outer panels 14 and 15 may be acted upon by the springs 19, it is to be explained that these panels are operatively connected such as by welding or otherwise, to the rods 20 or 21.

Rollers 23 vertically journalled in the side panels 14 and 15 as illustrated, facilitate the travel of wall 5 between the front and rear ends of the body 1 since it will be understood that these rollers bear against the inner surface of the side walls 2 and 3. The wall 5 is suspended upon the horizontally journalled rollers 24 journalled in the end-bearing portions 25 of shafts 20. In this connection it will be noted that an upwardly and outwardly inclining intermediate portion 26 is provided as a feature of the particular design exemplified. The rollers 24 ride on tracks 27 which form the base of elongated boxings generally designated 28 projecting outwardly from the upper edges of side walls 2 and 3. Intermediate portions 26 extend through the elongated entrance apertures 29 provided in these boxings. Numeral 30 designates conventional stiffening plates as commonly employed in steel excavation dump truck bodies.

The shafts 21 (as exemplified) are straight, out to the ends thereof, and, like shafts 20 terminate in rollers 31 which ride on the tracks 32 constituting the base of the elongated, channel shaped lower boxings 33 also pressed outwardly from the side walls 2 and 3.

It should be observed that the side panels 14 and 15 are preferably mounted to move inwardly and outwardly in their plane with facility, in virtue of resting against the cylinders 17 via the guides 34 welded to the cylinders 17. Proceeding next to explain the means for moving front wall 5 forwardly and rearwardly between the end limits of body 1, such construction is embodied in the following statement.

A winch collectively designated 35 operated from any convenient source of power is positioned transversely beneath the truck body. The winch will preferably be divided into right and left hand sheaves to accommodate the cable system generally designated 36 which lies parallel with and adjacent to each of the side walls 2 and 3. One end of each cable system is anchored to one or other sheave of the winch 35. Each cable system comprises upper and lower cables 37 and 38 (which may be wound upon the same sheave if desired) respectively. The upper cable 37 is anchored at 39 to each of the side walls within the housings 24. The cable-run extending forwardly from anchorage point 39 passes around pulley 41, to return in the form of upper run 42 and proceed downwardly in the form of run 43 after passing over pulley 44 also located within one of housings 24.

Cable-run 43 next passes around lower pulley 44 within channel 33 and extends forwardly in the form of run 45 to wind upon the winch 35.

Lower cable 38 is anchored at 46 to one of the side walls of the dump body 1, and proceeds forwardly in the form of run 47, to pass upwardly around pulley 48, and from thence, in the form of run 49 to proceed around pulley 44 (or another pulley side by side therewith). Cable 38 then proceeds to winch 35 in the form of run 50.

From the foregoing it will be apparent that the front wall 5 is carried vertically and steadily from front to back. Obviously means must be provided for returning the wall to the front. This however is deemed to be well within the skill of the art, particularly in view of what has already been described.

Finally it may be noted that pulleys 41 are in interfacial relationship with rollers 24. The complex of parts 24 and 41 is journalled in common upon the pair of spaced links 51. The front end of the links are connected by shaft 52 upon which single roller 53 is journalled also to ride upon the surfaces 27 or 32 already alluded to.

From all the foregoing it will be apparent that as soon as the winch 35 is started up, tail-gate 6 is unlatched. It will not move counter clockwise however until the load within the body forces it against the bias of spring 8. As the wall 5 moves rearwardly, the load will be precipitated off the rear end of the body 1. When the body is empty, the tail-gate will snap back to the position illustrated in the accompanying FIGURE 1, and the front wall 5 may be caused to return (as for example by a secondary winch and cable system). Any dirt which may have lodged on the floor 4 of the body in advance of wall 5 will be pushed ahead, and a suitable aperture will be provided in advance of the forward limit of travel of the said front wall to permit precipitation.

As will best be observed from the accompanying FIGURE 3, one of the links 51, is secured to or may form part of the parts 25, already referred to. The inclining part 26, as best illustrated in the accompanying FIGURE 3, widen out in the form of a bracket. The outer panels 14 and 15 are connected to these brackets as by means of such as the gusset plates 53.

Since various modifications can be made to the novel subject-matter herein, without departing from the inventive concept which the same embodies, it is not intended that protection of this invention by Letters Patent should be interpreted as restricted to the particular modification or modifications thereof particularly described and exemplified.

What I claim as my invention is:

1. In a dump truck body, in combination, a front wall, a movable tail-gate, and means for moving said front wall forwardly and rearwardly between the rigid side walls of said body in its plane to push a load contained between said front wall and tail-gate off the rear end of said body during the rearward movement of said front wall, said front wall consisting of at least two sectional panels in overlapping relationship, and spring-means co-acting between said panels normally to bias said panels outwardly so that the outer side edges of said front wall are contiguous to said side walls, said panels moving in the plane of said front wall upon encountering deformities in said side walls, said spring means including horizontally disposed cylindrical coil springs, housings for the same, said housings being secured upon the anterior surfaces of said panels, and abutments also secured to the anterior surface of said panels, part of each of said springs extending between one of said housings and one of said abutments.

2. In a dump truck body, a front wall formed of a centre sectional panel and two outwardly spring-biassed side sectional panels, a movable tail-gate, and means for moving said front wall forwardly and rearwardly between the rigid side walls of said body in its plane to push a load contained between said front wall and tail-gate off the rear end of said body during the rearward movement of said front wall, said sectional panels being in overlapping relationship, and spring-means co-acting between said panels normally to bias said panels outwardly so that the outer side edges of said front wall are contiguous to said side walls, said panels moving in the plane of said front wall upon encountering deformities in said side walls, said spring-means including horizontally disposed cylindrical coil springs, housings for the same secured upon the anterior surface of said centre panel, said side panels being apertured to accommodate said housings, and to permit movement of said side panels with respect to said housings, and abutments secured to said anterior surface, said springs extending between said housings and said abutments.

3. The invention according to claim 2 which includes a shaft extending into each of said housings, said shafts being outwardly biased by said springs, said shafts being operatively secured to said side panels to bias the same outwardly.

References Cited by the Examiner

UNITED STATES PATENTS

| | | | |
|---|---|---|---|
| 2,047,602 | 7/1936 | Tomlinson | 214—82 |
| 2,179,726 | 11/1939 | Lewis et al. | 214—82 |
| 2,512,339 | 6/1950 | Knapp | 214—82 |
| 2,909,295 | 10/1959 | Weir | 214—82 |
| 3,021,968 | 2/1962 | Myers | 214—82 |

FOREIGN PATENTS 480,039    3/1916    France.

GERALD M. FORLENZA, *Primary Examiner.*
A. J. MAKAY, *Assistant Examiner.*